(12) United States Patent
Murri

(10) Patent No.: US 8,894,040 B2
(45) Date of Patent: Nov. 25, 2014

(54) TRAILER TONGUE LIFT JACK

(76) Inventor: Mark Murri, Chester, ID (US)

(*) Notice: Subject to any disclaimer, the term of this patent is extended or adjusted under 35 U.S.C. 154(b) by 696 days.

(21) Appl. No.: 13/169,906

(22) Filed: Jun. 27, 2011

(65) Prior Publication Data

US 2012/0326106 A1 Dec. 27, 2012

(51) Int. Cl.
  *B60S 9/02* (2006.01)
  *B60S 9/08* (2006.01)
  *B60S 9/18* (2006.01)

(52) U.S. Cl.
  CPC ..... *B60S 9/08* (2013.01); *B60S 9/18* (2013.01)
  USPC .......................................................... 254/420

(58) Field of Classification Search
  CPC ................ B66F 3/10; B66F 7/22; B60S 9/08; B60S 9/18
  USPC ..................... 254/418, 420, 424, 425, 423, 98
  See application file for complete search history.

(56) References Cited

U.S. PATENT DOCUMENTS

| | | | |
|---|---|---|---|
| 3,740,077 A | 6/1973 | Williams | |
| 4,431,208 A | 2/1984 | Geeves | |
| 4,537,416 A | 8/1985 | Linaburg | |
| 4,961,589 A | 10/1990 | Faurenhoff | |
| 5,069,433 A * | 12/1991 | Womack | 269/277 |
| 5,174,550 A * | 12/1992 | Pittman | 254/420 |
| 5,195,769 A | 3/1993 | Williams, Jr. | |
| 5,690,348 A | 11/1997 | Williams, Jr. | |
| 6,193,258 B1 | 2/2001 | Kennedy | |
| 7,651,114 B2 | 1/2010 | Webert et al. | |
| 2011/0253954 A1* | 10/2011 | Fortner | 254/98 |

* cited by examiner

*Primary Examiner* — Lee D Wilson
*Assistant Examiner* — Nirvana Deonauth
(74) *Attorney, Agent, or Firm* — Robert L. Shaver; Dykas & Shaver

(57) ABSTRACT

Presented is a trailer tongue lift jack which tilts in order to allow the tongue and hitch to be aligned with a towing ball attached to a towing vehicle. The trailer lift jack includes a ball joint which allows the body of the hitch to tilt for this alignment step. The lift jack can also rotate to a storage position which is basically horizontal, and rotate to a lift position which is basically vertical for lifting the trailer tongue.

13 Claims, 4 Drawing Sheets

TRAILER TONGUE LIFT JACK

TECHNICAL FIELD

The presently disclosed and claimed technology generally relates to an apparatus for trailer tongue attachment to towing balls, and more particularly to a device for adjusting trailer tongue position to assist in hooking up to a towing ball.

BACKGROUND

Trailers of all kinds have a tongue, which is often triangular and tapers to a point, where the hitch is located. The hitch is generally made to fit over a towing ball, which is attached to a bumper or frame of a towing vehicle. The tongues of trailers of this type have a jack, which is used to lift and lower the tongue. Generally the jacks lift and lower the tongue and hitch straight up and down, so the hitch has to be positioned almost perfectly over the towing ball for the trailer to be connected to the towing vehicle. This is often a problem when the hitch and towing ball are not perfectly aligned. The user might have to reposition the towing vehicle, or try to move the trailer tongue side to side a bit. There is a need for a way to help connect the hitch and towing ball when the two are not perfectly aligned.

SUMMARY OF THE DISCLOSURE

The invention is a trailer tongue lift jack for adjusting the position of a trailer tongue for attachment to a towing ball. The device includes a generally cylindrical lift jack body attached to a trailer tongue frame. The lift jack body includes a lifting assembly, which is made up of a screw, extending essentially the full length of the lift jack and a crank handle. By turning the crank handle, the screw interacts with a nut internal to the lift jack and pushes out an extension of the lift jack. A platform or foot is attached to the extension tube, for contacting the ground or pavement.

The device also includes a tilt assembly as part of the lift jack body, which is configured to attach to the trailer tongue frame. The tilt assembly includes a ball joint mounted inside a cage. The ball joint is free to rotate inside the cage, with the cage attached to the lift jack body. By allowing the lift jack body to tilt left to right and forwards and backwards by use of its attachment to the ball joint, the tongue of the trailer can be moved in an amount sufficient to assist in centering the hits of the trailer on to a towing ball. The lift jack body can pass vertically through the ball joint, or the ball joint and tilt assembly can be attached to the frame, with the lift jack body attached on the side of the tilt assembly.

The cage is made of a cylindrical side wall with a top edge and a bottom edge. It has an annular top plate attached to the side wall top edge. The term "annular" is meant that the top plate is generally circular and has a generally circular hole in the center. An annular bottom plate is attached to the side wall bottom edge. The annular plates define a shaft passage in the center of the cage, through which the screw of the jack body may pass, but between which the ball joint is enclosed.

In one version of the device, the ball joint inside the cage is mounted contiguous with the jack body, with the screw of the jack body attaching to the top and bottom of the ball joint. Another version of the device includes a cage which has a single annular plate, through which the ball joint is attached to a shaft and collar which is clamped around the jack body.

A desirable, but not essential, feature of the invention is one or more bearings which support the ball joint inside the cage. The bearings serve to keep the ball joint freely turning and to transfer weight from the trailer tongue to the ball joint, and to facilitate adjustment of the tilt of the lift jack body.

A feature of the device is the inclusion of one or more set screws which are fitted in the cage supporting the ball joint. The set screw would typically fit inside a threaded opening through the side wall of the cage, and when tightened would lock the lift jack body in to a selected position. Another optional feature is the inclusion of one or more grooves in which the set screw would fit and which could allow the lift jack body to tilt and be guided by the set screw tracking in the groove. Such groove could include a horizontal groove along, basically the equator, of the ball joint. It could include a second groove which is basically a groove along one of the longitudinal lines of the globe of the ball joint.

The set screw and grooves could serve to secure the lift jack in a horizontal position on the trailer frame for traveling, and allow it to turn 90 degrees when needed to lift the tongue of the trailer.

The lift jack body would typically have a hand crank on the top end, and a foot plate on the bottom end. The lift jack body would typically have an extendable tube attached to the screw, and when the hand crank is turned, the threaded portion of the screw would turn in a fixed nut inside the generally cylindrical body, and push the extendable tube and foot pad out of the tubular body of the lift jack.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

Figure 1:
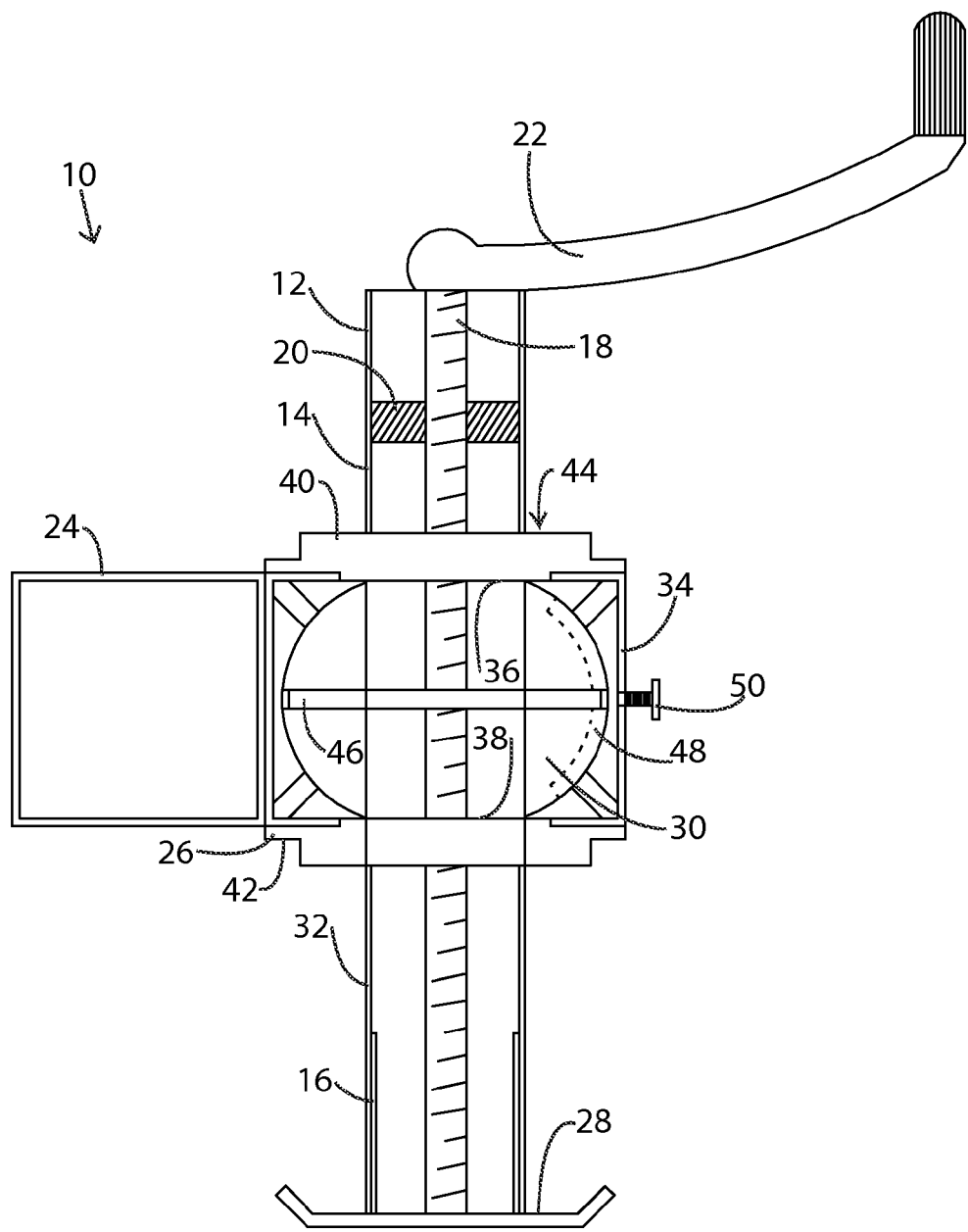
FIG. 1 is a side view, partial cross section of the lift jack.

Shown in FIGS. 1 through 4, are several embodiments of the trailer tongue lift jack of the disclosed technology. Shown in FIG. 1 is the generally cylindrical lift jack body 12, which in the embodiment shown is made of an outer cylinder 14 and an extendable tube 16. Internal to the lift jack body 12 is a screw 18, which is threaded and extends the length of the lift jack body. Lift jacks can be configured in a number of different manners, and the lift jack lifting mechanism, shown in FIG. 1, is an example of one type of lifting structure. Other physical arrangements of the lifting mechanism of the jack are possible, and fall within the intended scope of the claims.

The screw 18 is routed through a fixed nut 20, so that as the crank arm 22 is rotated, the screw 18 turns, and forces the extension or retraction of the extendable tube 16. This causes the attached trailer tongue to be raised or lowered.

Shown in FIG. 1 is a section of trailer tongue frame 24 which in this case is a square tube, but other configurations and sizes of tubing are also possible. Attached to the trailer tongue frame 24 is a cage 26, attached to the end of the lift jack body 12 is a foot pad 28.

The cage 26 encloses a ball joint 30 which is free to rotate inside the cage 26. The ball joint 30. In one example of the technology, the ball joint can be 4½ inches in diameter, with the cage being dimensioned to enclose the ball.

In the embodiment of the lift jack shown in FIG. 1, the upper part of the lift jack body 12 is attached to the ball joint 30. All or part of the lift jack body may extend through the ball joint 30, or a separate section of the lift jack body 32 can be attached to the lower part of the ball joint 30. In any case, the ball joint 30 and the upper and lower parts of the lift jack body are attached together to form one unit. The ball joint 30 is able to rotate inside the cage 26, so that the lift jack body 12 can tilt left and right, forward and backward. This serves to allow some adjustment in position of the trailer hitch on the tongue of the trailer, so that it can be adjusted to fit over the towing ball of a towing vehicle.

In the embodiment shown in FIG. 1, the cage is made up of a cylindrical side wall 34 with an annular top plate attached to the side wall, top edge. The cylindrical side wall 34 has a top edge 36 and a bottom edge 38. The aversion of the device shown in FIG. 1 includes an annular top plate 40 and an annular bottom plate 42. By annular it is meant that the top and bottom plate 40 and 42 are generally circular with a circular hole in their center. A circular hole forms a shaft passage 44. The shaft passage 44 is a larger diameter than the diameter of the lift jack body 12 and thus allows the lift jack body 12 to tilt to a certain degree.

The ball joint 30 may be a solid ball or a ball with a shaft from one end to the other. Optionally, it may have one or more grooves in which a set screw may be inserted in order to lock the rotation of the ball entirely or to confine it to the groove. Shown in FIG. 1 are a first groove 46 and a second groove 48. As shown in FIG. 1, the first groove 46 is a generally horizontal groove, which is positioned approximately on the equator of the spherical ball joint 30. The second groove 48 is a generally horizontal groove, or if described in terms of a globe, it is along a longitudinal access.

Figure 2:
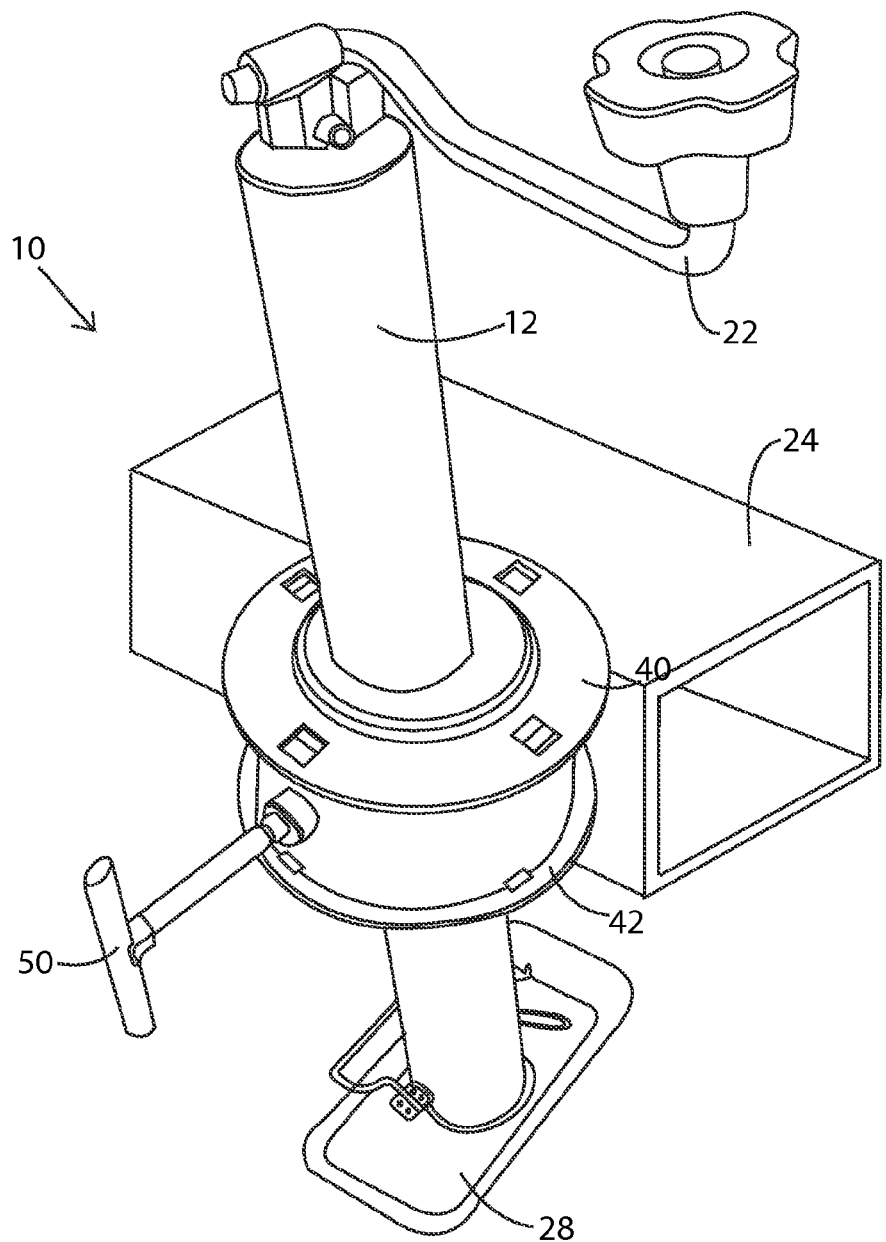
FIG. 2 is a perspective view of the lift jack.

FIG. 2 is a perspective view of the same embodiment shown in FIG. 1. FIG. 2 shows a portion of the trailer tongue frame 24, attached to the cage 26. Also shown are the annular top plate 40, and the annular bottom plate 42, the set screw 50, the crank 22 and a foot pad 28.

Figure 3:
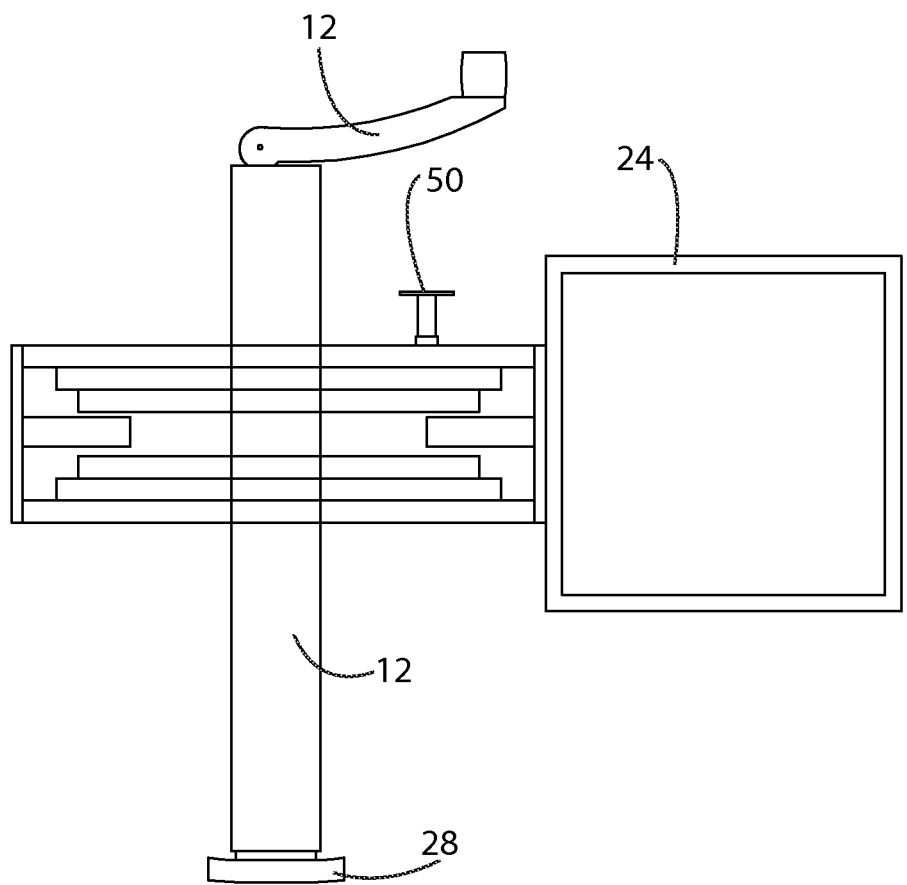
FIG. 3 is a side view of one version of the lift jack.

FIG. 3 is an alternate embodiment of the disclosed technology, in which the tilting assembly is formed by a number of plates which form a shaft passage which together allow the lift jack body 12, to pass through the tilting assembly. The plates can be locked together with the set screw 50, or when loosened can allow the lift jack body 12 to form a shaft passage 44, at angles other than vertical, so that the hitch of a trailer tongue may be moved to assist in connecting it to a towing ball.

In the embodiment of FIG. 3, the cage is generally the same as that shown in FIG. 1. The cage encloses a number of annular plates with a hole in the center, with the hole being larger than the diameter of the jack body. The center plate or plates are welded in place inside the cage, which provides a pivot point for the tilting of the jack body. The other plates are smaller in diameter than the cage, which allows them to move as the jack body tilts. The set screw serves the purpose of locking the plates at a selected position.

Figure 4:
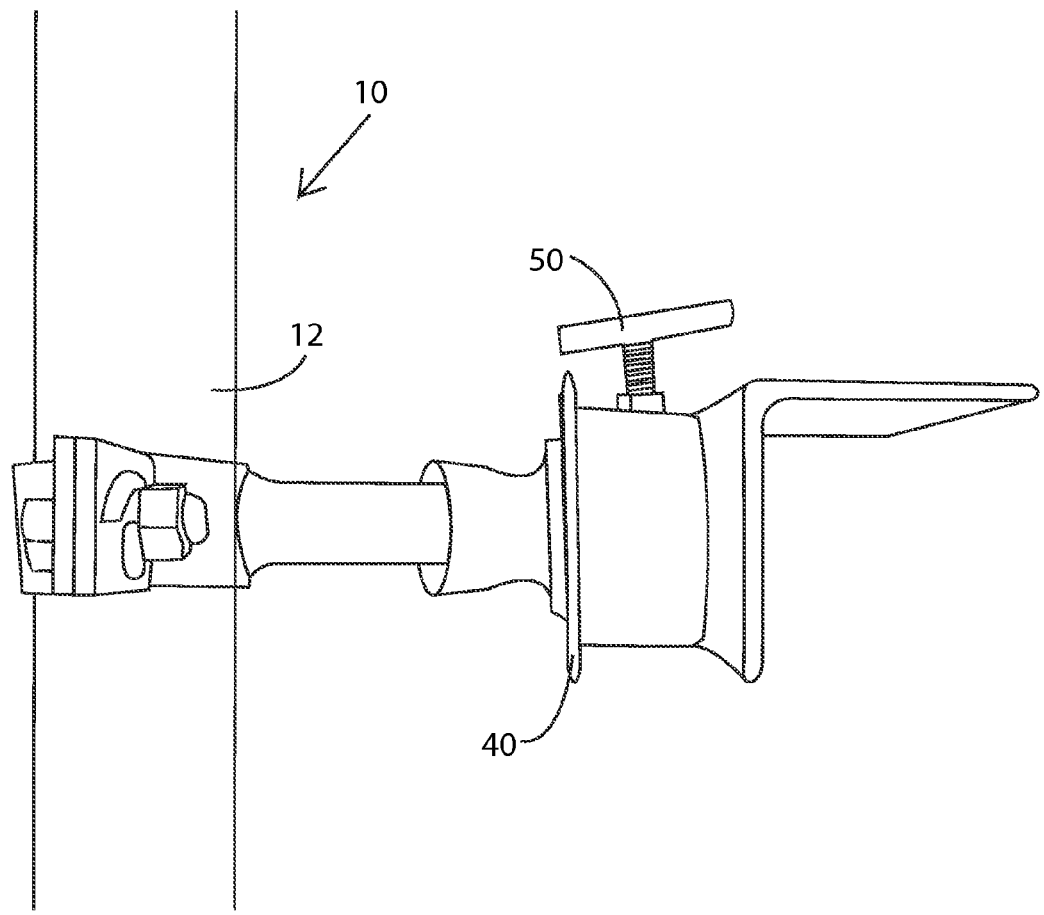
FIG. 4 is a side view of one version of the lift jack.

FIG. 4 is an alternate version of the lift jack of the disclosed technology, in which the tilting assembly 56, is attached to the lift jack body 12, but in which the lift jack body 12 does not pass through the center of the ball joint.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A trailer tongue lift jack comprising:
   a generally cylindrical lift jack body attached to a trailer tongue frame, said lift jack body having a lifting assembly comprising a screw with a crank handle, for lifting said trailer tongue; and
   a tilt assembly attached to said trailer tongue frame, said tilt assembly comprising a ball joint, and a cage enclosing said ball joint, with said ball joint and said cage allowing said lift jack body to tilt in order to move said trailer tongue when connecting said trailer tongue to a tow hitch; and
   a cylindrical sidewall with a top edge and a bottom edge, an annular top plate attached to said sidewall top edge, an annular bottom plate attached to said sidewall bottom edge, with said annular plates defining a shaft passage between said lift jack body to allow said lift jack body to tilt.

2. The trailer tongue lift jack of claim 1 which further comprises a bearing attached to said annular top plate and positioned to contact said ball joint.

3. The trailer tongue lift jack of claim 1 which further comprises a set screw in said sidewall, with a threaded screw passage, and a threaded set screw, with said set screw configured to press against said ball joint when turned, thereby immobilizing said ball joint.

4. A trailer tongue lift jack, comprising:
   a generally cylindrical lift jack body attached to a trailer tongue frame, said lift jack body having a lifting assembly comprising a screw with a crank handle, for lifting said trailer tongue;
   a tilt assembly attached to said trailer tongue frame, said tilt assembly comprising a ball joint, and a cage enclosing said ball joint, with said ball joint and said cage allowing said lift jack body to tilt in order to move said trailer tongue when connecting said trailer tongue to a tow hitch;
   said cage further comprising a cylindrical sidewall with a top edge and a bottom edge, an annular top plate attached to said sidewall top edge, an annular bottom plate attached to said sidewall bottom edge, with said annular plates defining a shaft passage between said lift jack body to allow said lift jack body to tilt;

a bearing attached to said annular top plate on a bottom side positioned to contact said ball joint;

at least one set screw in said sidewall, with a threaded screw passage, and a threaded set screw, with said set screw configured to press against said ball joint when turned, thereby immobilizing said ball joint; and a foot plate on an end of said lift jack body opposite said crank handle.

5. The trailer tongue lift jack of claim 4 in which said tilt assembly is attached to said trailer tongue frame, and said lift jack body is externally attached to said tilt assembly.

6. The trailer tongue lift jack of claim 4 in which said tilt assembly is attached to said trailer tongue frame, and said lift jack body is attached to said ball joint, with said tilt assembly incorporated into said lift jack body.

7. The trailer tongue lift jack of claim 3 in which said ball joint further comprises at least one groove in said ball joint for engagement with said set screw.

8. The trailer tongue lift jack of claim 1 which further comprises a foot plate on an end of said lift jack body opposite said crank handle.

9. The trailer tongue lift jack of claim 4 which further comprises two set screws, and two grooves in said ball joint for engagement of said set screws.

10. A trailer tongue lift jack, comprising;

a generally cylindrical lift jack body attached to a trailer tongue frame, said lift jack body having a lifting assembly comprising a screw with a crank handle, for lifting said trailer tongue;

a tilt assembly attached to said trailer tongue frame, said tilt assembly comprising a ball joint, and a cage enclosing said ball joint, with said ball joint and said cage allowing said lift jack body to tilt in order to move said trailer tongue when connecting said trailer tongue to a tow hitch;

said cage further comprising a cylindrical sidewall with a top edge and a bottom edge, an annular top plate attached to said sidewall top edge, an annular bottom plate attached to said sidewall bottom edge, with said annular plates defining a shaft passage between said lift jack body to allow said lift jack body to tilt;

a bearing attached to said annular top plate on a bottom side positioned to contact said ball joint;

at least one set screw in said sidewall, with a threaded screw passage, and a threaded set screw, with said set screw configured to press against said ball joint when turned, thereby immobilizing said ball joint;

at least one groove in said ball joint for engagement with said set screw. and a foot plate on an end of said lift jack body opposite said crank handle.

11. The trailer tongue lift jack of claim 10 in which said ball joint further comprises at least one groove for engagement with said set screw.

12. The trailer tongue lift jack of claim 10 which further comprises a foot plate on an end of said lift jack body opposite said crank handle.

13. The trailer tongue lift jack of claim 10 which further comprises two set screws, and two grooves for engagement of said set screws.

\* \* \* \* \*